United States Patent
Joerger et al.

(10) Patent No.: US 10,583,606 B2
(45) Date of Patent: Mar. 10, 2020

(54) METHOD AND SUPPORTS WITH POWDER REMOVAL PORTS FOR ADDITIVE MANUFACTURING

(71) Applicant: GENERAL ELECTRIC COMPANY, Schenectady, NY (US)

(72) Inventors: Daniel Joerger, Cincinnati, OH (US); Neal Dunham, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 15/041,980

(22) Filed: Feb. 11, 2016

(65) Prior Publication Data

US 2017/0232670 A1 Aug. 17, 2017

(51) Int. Cl.
*B29C 64/153* (2017.01)
*B33Y 10/00* (2015.01)

(52) U.S. Cl.
CPC ............ *B29C 64/153* (2017.08); *B33Y 10/00* (2014.12)

(58) Field of Classification Search
CPC ........ B22F 3/1055; B33Y 30/00; B29C 64/40
See application file for complete search history.

(56) References Cited

U.S. PATENT DOCUMENTS

| | | |
|---|---|---|
| 4,863,538 A | 9/1989 | Deckard |
| 5,460,758 A | 10/1995 | Langer et al. |
| 5,529,471 A | 6/1996 | Khoshevis |
| 5,656,230 A | 8/1997 | Khoshevis |
| 5,837,960 A | 11/1998 | Lewis et al. |
| 5,897,825 A | 4/1999 | Fruth et al. |
| 6,471,800 B2 | 10/2002 | Jang et al. |
| 6,995,334 B1 | 2/2006 | Kovacevic et al. |
| 7,381,921 B2 | 6/2008 | Hagemeister et al. |
| 7,435,072 B2 | 10/2008 | Collins et al. |
| 8,470,234 B2 * | 6/2013 | Clark ............... B22F 3/1055 264/109 |
| 8,506,836 B2 | 8/2013 | Szuromi et al. |
| 8,684,069 B2 | 4/2014 | Mottin et al. |

(Continued)

FOREIGN PATENT DOCUMENTS

| EP | 1 947 907 A2 | 7/2008 |
|---|---|---|
| EP | 2 447 046 A2 | 5/2012 |

(Continued)

OTHER PUBLICATIONS

Forderhase et al., "Reducing or Eliminating Curl on Wax Parts Produced in the Sinterstation™," 2000 System, (Abstract) pp. 94-100.

(Continued)

*Primary Examiner* — Jacob T Minskey
*Assistant Examiner* — Melody Tsui
(74) *Attorney, Agent, or Firm* — Dority & Manning, P.A.

(57) ABSTRACT

The present disclosure generally relates to methods for additive manufacturing (AM) that utilize powder removal ports in the process of building objects, as well as novel support structures including powder removal ports to be used within these AM processes. The objects include walls defining regions of unfused powder. The powder removal ports include at least one tube aligned with an opening in the walls to allow removal of the powder. The methods include removing unfused powder from the enclosed space via the at least one tube.

19 Claims, 6 Drawing Sheets

(56) References Cited

U.S. PATENT DOCUMENTS

| | | |
|---|---|---|
| 9,188,341 B2 | 11/2015 | McMasters et al. |
| 2002/0062909 A1 | 5/2002 | Jang et al. |
| 2004/0084814 A1* | 5/2004 | Boyd .................. B29C 64/153 264/497 |
| 2006/0118532 A1* | 6/2006 | Chung .................. B22F 3/1028 219/121.85 |
| 2012/0018926 A1 | 1/2012 | Mannella et al. |
| 2013/0071562 A1 | 3/2013 | Szuromi et al. |
| 2013/0316084 A1 | 11/2013 | Szuromi et al. |
| 2014/0251481 A1 | 9/2014 | Kroll et al. |
| 2014/0252684 A1 | 9/2014 | Swanson et al. |
| 2014/0335313 A1 | 11/2014 | Chou et al. |
| 2015/0021379 A1 | 1/2015 | Albrecht et al. |
| 2016/0332371 A1* | 11/2016 | Staroselsky .............. B22F 5/04 |
| 2017/0232511 A1 | 8/2017 | Fieldman et al. |
| 2017/0232512 A1 | 8/2017 | Joerger |
| 2017/0232671 A1 | 8/2017 | Fieldman |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |

FOREIGN PATENT DOCUMENTS

| | | |
|---|---|---|
| EP | 2570595 A1 | 3/2013 |
| EP | 2 583 774 A2 | 4/2013 |
| EP | 3 053 720 A1 | 8/2016 |
| WO | WO 2014/071135 A1 | 5/2014 |
| WO | 2015/171841 A1 | 11/2015 |

OTHER PUBLICATIONS

Carter Jr. et al., General Electric, "Direct Laser Sintering of Metals", (Abstract), pp. 51-59.

Jacobson et al., "Practical Issues in the Application of Direct Metal Laser Sintering," (Abstract), pp. 728-739.

Extended European Search Report and Opinion issued in connection with corresponding EP Application No. 17155572.5 dated Jul. 3, 2017.

* cited by examiner

METHOD AND SUPPORTS WITH POWDER REMOVAL PORTS FOR ADDITIVE MANUFACTURING

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of unfused powder by, for example, blowing or vacuuming. Other post processing procedures include a stress release process. Additionally, mechanical, thermal, and chemical post processing procedures can be used to finish the part 122.

The present inventors have discovered that additive manufacturing techniques may be used to create objects, support structures, or combinations thereof that define enclosed spaces. The enclosed spaces may retain powder, which may be removed by post-processing operations. In some cases, the retained powder may become sintered during post-processing procedures, making it more difficult to remove the retained powder.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes: (a) irradiating a layer of powder in a powder bed to form a fused region; (b) providing a subsequent layer of powder over the powder bed; and (c) repeating steps (a) and (b) until the object and at least one tube is formed in the powder bed, wherein the object includes a wall and a region of unfused powder within the object and an opening in the wall exposing the region of unfused powder. The tube is aligned with the opening in the wall. The method also includes (d) removing unfused powder from the region of unfused powder via the tube.

These and other aspects of the invention will become more fully understood upon a review of the detailed description, which follows.

DETAILED DESCRIPTION

Figure 1:
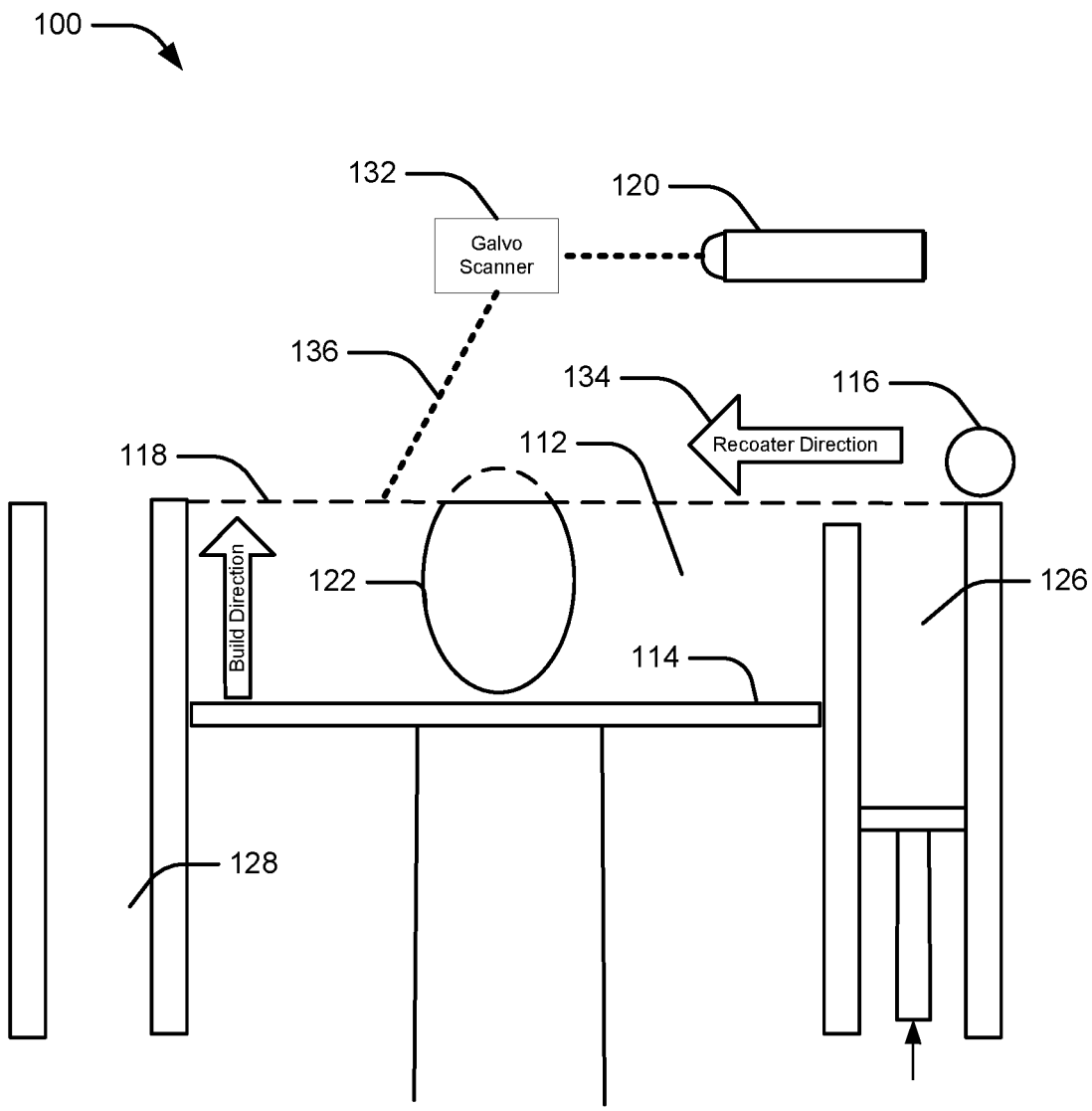
FIG. 1 is schematic diagram showing an example of a conventional apparatus for additive manufacturing.
Figure 2:
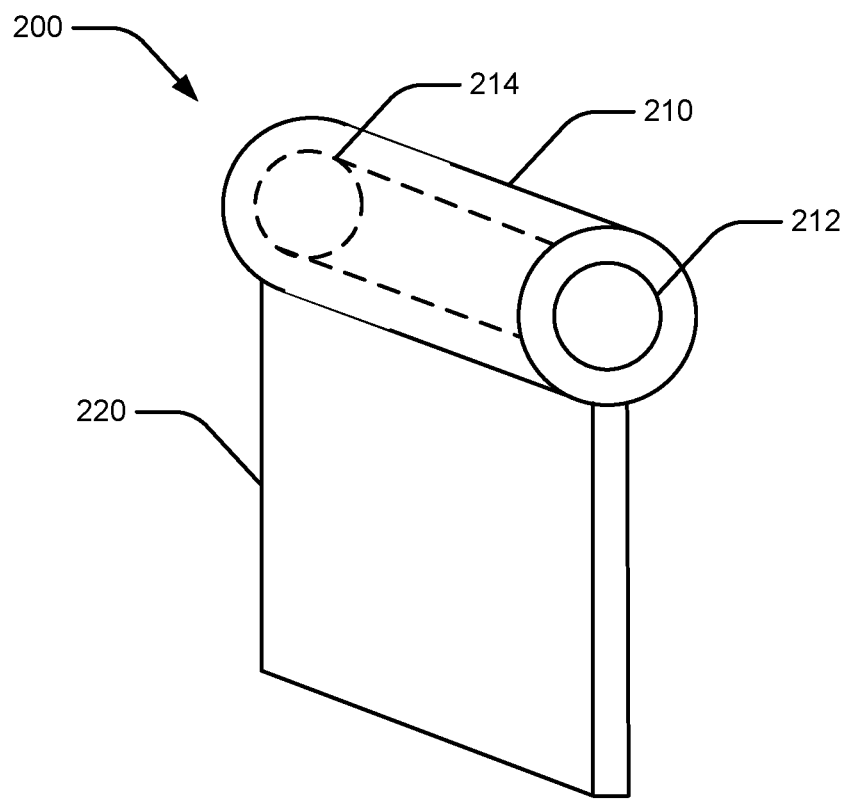
FIG. 2 illustrates a perspective view of an example powder removal port in accordance with aspects of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts FIG. 2 illustrates a perspective view of an example powder removal port 200. The powder removal port 200 includes a tube portion 210 and a support portion 220. The powder removal port 200 may be manufactured according to an AM process. For example, the apparatus 100 of FIG. 1 and method described above may be used. In this type of AM process, the powder removal port 200 is built layer-by-layer by selectively sintering or melting areas of the powder in the regions that form the powder removal port 200. The tube portion 210 includes openings 212, 214 at each end and a passage between the openings. In an aspect, the openings 212, 214 and the passage may have an inner diameter of approximately 0.050 inches or more, preferably at least 0.060 inches. As illustrated, the tube portion 210 is a straight tube. In another aspect, the tube portion 210 is curved. Additionally, the example tube portion 210 is illustrated as a cylindrical tube. It should be appreciated that a tube portion may have any closed cross-section and may be fabricated using additive manufacturing.

The support portion 220 provides support for the tube portion 210 during the additive manufacturing process. In an aspect, the support portion 220 is a solid support underneath the tube portion 210. For example, the support portion 220 extends down from the local minima of the tube portion 210.

Figure 3:
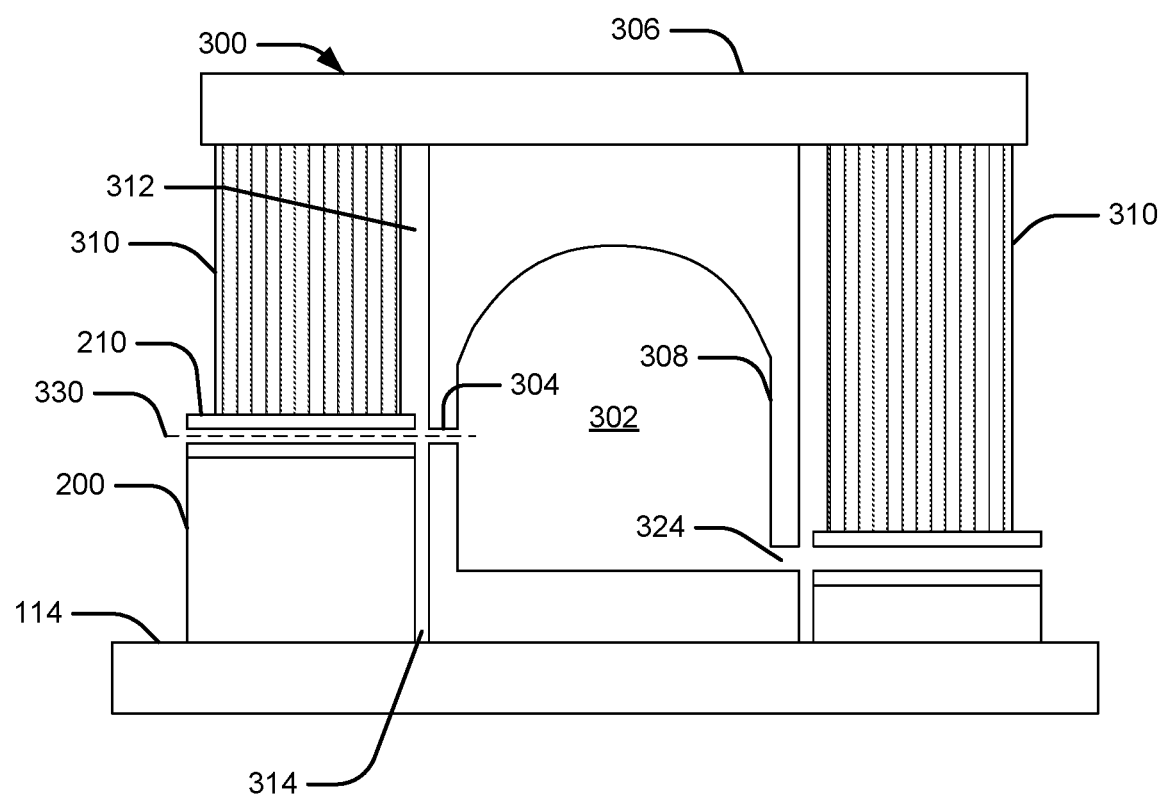
FIG. 3 illustrates a vertical cross-sectional view of an object and support structure including a powder removal port.
Figure 4:
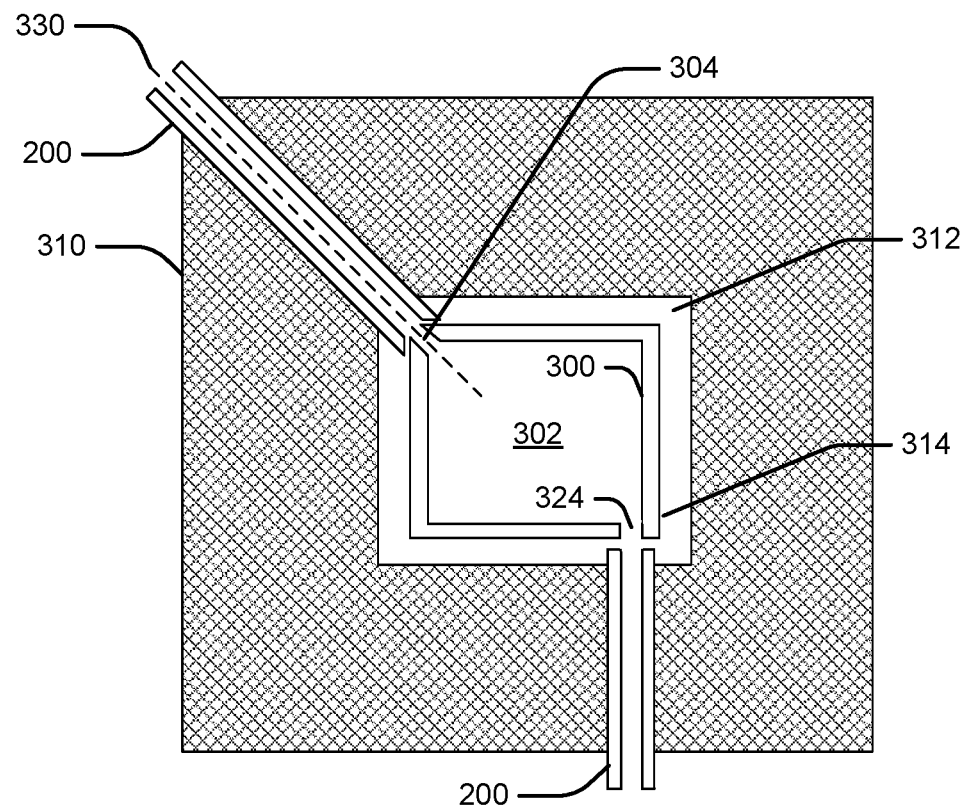
FIG. 4 illustrates a horizontal cross-sectional view of the object and support structure in FIG. 3.

FIG. 3 illustrates a vertical cross-sectional view of an example object 300 and example support structure 310 including a powder removal port 200. FIG. 4 illustrates a horizontal cross-sectional view of the example object 300 and example support structure 310 including the powder removal port 200. The object 300 includes, for example, a top portion 306 and walls 308. A support structure 310 supports the top portion 306. Powder removal ports 200 are located adjacent the walls 308.

The object 300, the support structure 310, and the powder removal ports 200 may be manufactured according to an AM process. For example, the apparatus 100 of FIG. 1 and method described above may be used. In this type of AM process, the object 300 is built layer-by-layer by selectively sintering or melting areas of the powder in the regions that form the object 300. The support structure 310 is built simultaneously with the object 300 by melting or sintering additional regions of the powder in the location of the support structure 310.

Upon completion of the AM process, the object 300 may be removed from the powder bed. Unfused powder is then removed from the object 300. In an aspect, the support structure 310 is removed from the object 300. In one aspect, the support structure 310 is attached along with the object to the build plate and may be detached from the build plate and discarded. The support structure 310 may alternatively be formed without attachment to the build plate as a free standing object within the powder bed. In addition, the support structure may include a point of attachment to the object 300 that may be readily broken away once the AM process is complete. This may be accomplished by providing a breakaway structure—a small tab of metal joining the object 300 and support structure 310. The breakaway structure may also resemble a perforation with several portions of metal joining the object 300 and support structure 310.

The removal of the support structure 210 from the object 200 may take place immediately upon, or during, removal of the object from the powder bed. Alternatively, the support structure may be removed after any one of the post-treatment steps. For example, the object 200 and support structure 210 may be subjected to a post-anneal treatment and/or chemical treatment and then subsequently removed from the object 200 and/or build plate.

Figure 5:
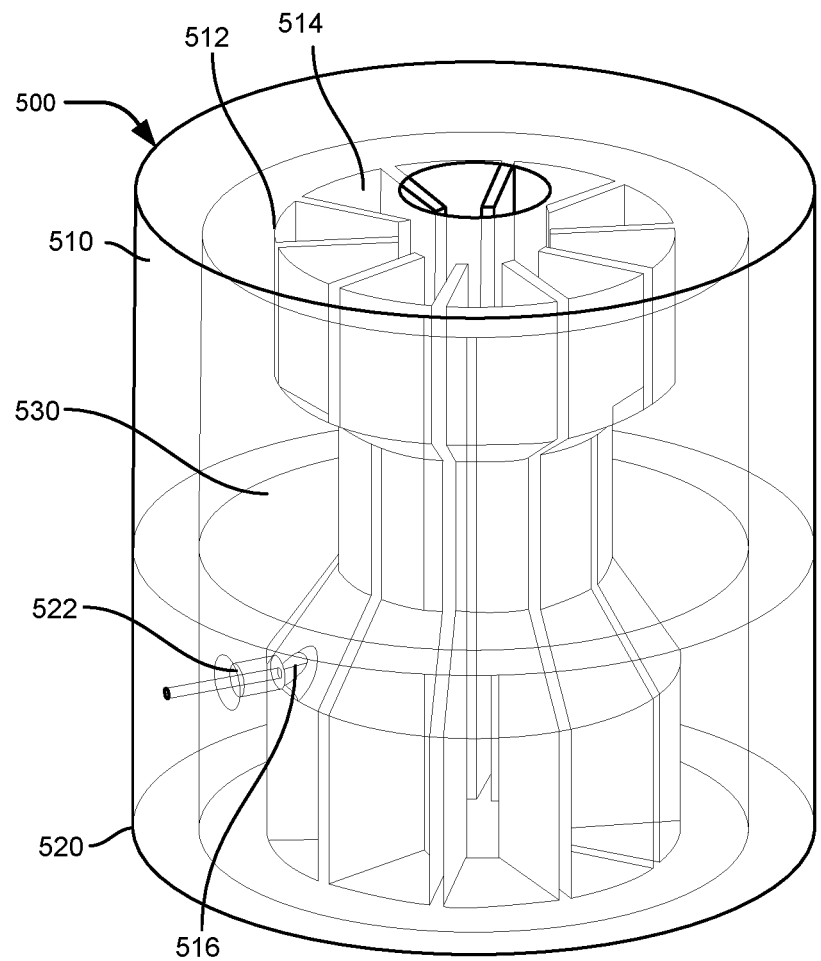
FIG. 5 illustrates a perspective view of another example of an object and a support structure defining one or more enclosed spaces in accordance with aspects of the present invention.
Figure 6:
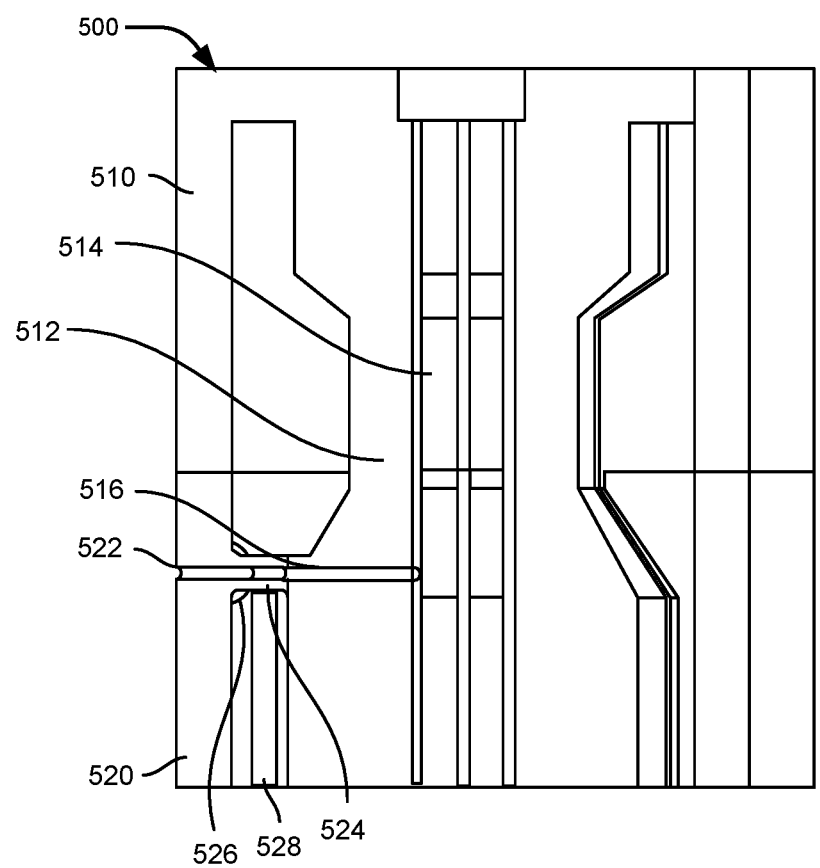
FIG. 6 illustrates a vertical cross-sectional view of the object and the support structure in FIG. 5.

The present inventors have found that removing the unfused powder from certain objects can present problems. For example, some objects include enclosed spaces that retain powder. The object 300 in FIGS. 3 and 4 and the object 500 in FIGS. 5 and 6 are examples of such objects. The powder removal ports 200 facilitate removal of unfused powder.

As illustrated in FIGS. 3 and 4, the walls 308 enclose a region of unfused powder 302. During the additive manufacturing process, the walls 308 are built up from the platform 114 around the region of unfused powder 302 and eventually enclose the region of unfused powder 302. The object 302 includes openings 304, 324 through one or more walls of the object 300. For example, the opening 304 may be located on one side of the object 300 at a first height and the opening 324 may be located on an opposite side of the object 300 at a different height. The openings 304, 324 may be paths for fluid to flow (e.g., inlets or outlets) of the object 300. In another aspect, the openings 304, 324 may be temporary openings that will be filled during a post-processing process, for example, by spot welding.

The top portion 306 is supported by a support structure 310. For example, the support structure 310 provides support for the sections of the top portion 306 that extend beyond the walls 308. As best viewed in FIG. 4, the support structure 310 may surround the walls 308. The support structure 310 is built up from the platform 114 and the powder removal port 200 to the top portion 306. The support structure 310 may include various known supports for supporting a bottom surface in additive manufacturing. In an aspect, the support structure 310 includes a matrix support including, for example, non-overlapping adjacent cross hatching (e.g., scan lines). For example, the area between the platform 114 and the top portion 306 may be filled with such matrix support, which may provide a low density structure for supporting the top portion 306 as it is built. In an aspect, a matrix support may be automatically generated for an object to support any bottom surface of the object 306 that is not connected to the platform 114. For example, the MAGICS™ software from Materialise NV may generate matrix supports. In another aspect, the support structure 310 is a solid support or a solid wall. In another aspect, the support structure 310 includes a plurality of supports with open spaces or unfused powder between the plurality of supports. In one aspect, the support structure 310 is automatically generated for an object to support any bottom surface of the object 306 that is not connected to the platform 114. The support structure 310 is separated from the walls 308 by a separation 312 to prevent the support structure 310 from becoming fused to the walls 308. The separation 312 includes a region of unfused powder during fabrication, which may be removed during a post-processing procedure.

The region of unfused powder 302 may be considered an enclosed space. In an aspect, an enclosed space may be any space surrounded by one or more objects, support structures, the platform, or portions thereof. For example, the region of unfused powder 302 is surrounded by the walls 308 and the top portion 306. The enclosed space may contain unfused powder or air. In an aspect, powder remaining in an enclosed space when the object 300 is completed is difficult or impossible to remove from the enclosed space. For example, a completely enclosed space may include no path for the powder to exit the completely enclosed space. A partially enclosed space may restrict the movement of powder from the partially enclosed space.

In an aspect, even if the object 300 includes openings 304 and 324 to the region of unfused powder 302, the openings 304 and 324 may be blocked, for example, by support structure 310. For example, the support structure 310 prevents a tool such as source of compressed gas or vacuum from being placed at the opening 304. Where the support structure 310 is solid, the support structure 310 may also block any air flow to the openings 304. Where the support structure 310 includes open spaces, an air flow path to the openings 304 may be too convoluted or open to provide sufficient air flow through the openings 304, 324. For example, air pressure or vacuum may be dissipated by open spaces between a plurality of supports.

The powder removal port 200 may be included as a portion of the support structure 310 to direct an air flow or vacuum to the openings 304. The powder removal port 200 is built up from the platform 114. The tube portion 210 is aligned with an opening 304. For example, a continuous path 330 is formed from the region of unfused powder 302 through the opening 304 and the tube portion 210 to a location external to the support structure 310. In an aspect, a source of air pressure or vacuum is attached to the tube portion 210 to remove the unfused powder from the region of unfused powder 302. In an embodiment, the support structure 310 includes at least two powder removal ports 200. A source of air pressure is attached to a first powder removal port 200 and a source of vacuum is attached to a second powder removal port 200.

In an aspect, the powder removal port 200 is separated from the object 300 by a separation 314. The separation 314 prevents the powder removal tube 200 from becoming fused with the walls 308. During fabrication, the separation 314 includes unfused powder. Accordingly, the powder removal tube 200 may be easily removed from the object 300. In an aspect, the separation 314 is preferably a minimum separation sufficient to prevent fusing the powder removal tube 200 to the walls 308. For example, the separation 314 is at least approximately 0.004 inch depending on the powder and energy beam used. The separation 314 may minimize leakage of air pressure or vacuum from the tube portion 210 into the separation 312. The separation 314 is generally less than the separation 312 such that the powder removal tube 200 is closer to the wall 308 than the support structure 310. For example, the separation 314 may be approximately half of the separation 312.

As best seen in FIG. 3, the powder removal port 324 is located at a bottom corner (i.e., the intersection of a wall 308 and a bottom surface). In an aspect, gravity may pull unfused powder toward the powder removal port 328. As best seen in FIG. 4, in an aspect, the opening 304 is located at an intersection of two internal surfaces of the object 300. During a powder removal procedure, the object 300 and the support structure 310 including the powder removal ports 200 are placed on a vibration table and vibrated. The vibrations loosen compacted powder to facilitate removal via the powder removal ports 200. The object 300 may be also rotated during vibration such that gravity draws the unfused powder toward one of the openings 304, 324. The location of the openings 304, 324 at the intersection of two internal surfaces helps guide the unfused powder to the powder removal ports 200.

FIG. 5 illustrates another example of an object 500 and a support structure 520 defining one or more enclosed spaces accessible via a powder removal port 522. FIG. 6 illustrates a vertical cross-sectional view of the object 500 and the support structure 520. The object 500, the support structure 510, and the powder removal port 522 may be manufactured according to an AM process. For example, the apparatus 100 of FIG. 1 and method described above may be used. In an aspect, the object 500 includes an outer portion 510. The support structure 520 supports the outer portion 510 and also has a generally cylindrical shape. For example, the support structure 520 includes a circular top surface supporting a circular bottom surface of the outer portion 510. The object 500 further includes an inner portion 512. The cylindrical outer portion 510 and the support structure 520 define an enclosed space 530 between the outer portion 510 and the inner portion 512 of the object 500.

In an aspect, the inner portion 512 encloses an enclosed space 514 within the object 500. For example, various objects for containing or moving fluids define enclosed spaces within the object (e.g., tanks, reservoirs, pipes, or chambers). In an aspect, the object 500 further includes a passage 516 extending from the enclosed space 530 through the inner portion 512 to the enclosed space 514. The passage 516 may be considered an extended opening. When the finished object 500 is containing or moving fluids, the passage 516 may be an outlet or an inlet for the fluids to or from the enclosed space 514 within the object 400. During fabrication, however, the enclosed space 514 may be filled with unfused powder. The passage 516 provides the only path out of the enclosed space 514. Access to the passage 516, however, is blocked by the support structure 520 and the outer portion 510.

The support structure 520 includes a powder removal port 522. The port 522 includes a tube portion 524 and a support 528. The port 522 extends from the outer surface of the support structure 520 through the enclosed space 530 to the passage 516. In an aspect, the tube portion 524 is supported at one end by a flange 526 between the tube portion 524 and the support structure 520. The support 528 is a solid vertical support providing support for a horizontal portion of the tube portion 524. The tube portion 524 separates the port 522 from the enclosed space 530 to create a continuous path between the enclosed space 514 and an area external to the support structure 520. The tube portion 524 may be in contact with the object 500, or may be separated as discussed above regarding the powder removal port 200 and the object 300. During post-processing, powder within the enclosed space 514 is removed via the passage 516 and the port 522, for example, by inserting a vacuum tube though the passage 516 and the port 522 or applying suction to the port 522.

When it becomes necessary to remove the support structure 310/510 from the object 300/500, the operator may apply force to break the support structure free when contact surfaces are present. The support structure may be removed by mechanical procedures such as twisting, breaking, cutting, grinding, filing, or polishing. Additionally, thermal and chemical post processing procedures may be used to finish the object. When no contact surfaces are present and instead powder has been placed between the object and the support structure during manufacturing, the powder can simply be removed by blowing, for example, using pressurized air. The removal of the support structure 310/510 from the object 300/500 may take place immediately upon or during removal of the object from the powder bed. Alternatively, the support structure may be removed after any one of the post-treatment steps. For example, the object 300/500 and support structure 310/510 may be subjected to a post-anneal treatment and/or chemical treatment and then subsequently removed from the object 300/500 and/or build plate.

Although several examples of support structures and objects have been provided, it should be apparent that other objects may be built in accordance with the present disclosure. For example, any object having a downward facing convex surface may be supported by one or more of the disclosed support structures. In an aspect, the disclosed support structures are used to manufacture parts for aircraft. For example, a fuel nozzle similar to the one disclosed in U.S. Pat. No. 9,188,341 may be manufactured using support structures disclosed herein.

In an aspect, multiple supports described above may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING" to inventors, and filed Feb. 11, 2016;

U.S. patent application Ser. No. 15/042,024, titled "METHOD AND CONNECTING SUPPORTS FOR ADDITIVE MANUFACTURING", and filed Feb. 11, 2016;

U.S. patent application Ser. No. 15/041,973, titled "METHODS AND SURROUNDING SUPPORTS FOR ADDITIVE MANUFACTURING", and filed Feb. 11, 2016;

U.S. patent application Ser. No. 15/042,010, titled "METHODS AND KEYWAY SUPPORTS FOR ADDITIVE MANUFACTURING", and filed Feb. 11, 2016;

U.S. patent application Ser. No. 15/042,001, titled "METHODS AND BREAKABLE SUPPORTS FOR ADDITIVE MANUFACTURING", and filed Feb. 11, 2016; and U.S. patent application Ser. No. 15/041,911, titled "METHODS AND LEADING EDGE SUPPORTS FOR ADDITIVE MANUFACTURING", and filed Feb. 11, 2016.

The disclosure of each of these application are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface still provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unfused powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.)

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
   (a) irradiating a layer of powder in a powder bed to form a fused region;
   (b) providing a subsequent layer of powder over the powder bed; and
   (c) repeating steps (a) and (b) until the object and a removable support structure including at least one tube is formed in the powder bed, wherein the object includes a wall and a region of unfused powder within the object and an opening in the wall exposing the region of unfused powder, the tube being aligned with the opening in the wall, wherein the opening in the wall includes a first opening at a first height and a second opening at a second height different from the first height; and
   (d) removing unfused powder from within the object via the tube.

2. The method of claim 1, wherein the tube is separated from the object by a portion of unfused powder.

3. The method of claim 2, wherein the portion of unfused powder is at least 0.003 inches.

4. The method of claim 1, wherein the tube extends through a region of unfused powder between the support structure and the object.

5. The method of claim 4, wherein a separation between the tube and the object is less than half of a distance between the removable support structure and the object.

6. The method of claim 4, wherein the removable support structure includes a second wall, and the tube extends through the second wall.

7. The method of claim 1, wherein the removable support structure includes a plurality of supports with unfused powder between the plurality of supports, and wherein the tube extends from a location external to the plurality of supports to the location adjacent the object.

8. The method of claim 1, wherein the removable support structure is a matrix support.

9. The method of claim 1, wherein the tube includes a solid vertical support under the tube.

10. The method of claim 1, further comprising vibrating the removable support structure and the object to loosen the unfused powder.

11. The method of claim 1, wherein the opening includes a passage extending from the region of unfused powder to an outer surface of the object.

12. The method of claim 11, wherein the tube is aligned with the passage to form a continuous path from the region of unfused powder to a location external to the removable support structure.

13. The method of claim 1, wherein removing the unfused powder comprises blowing a gas through the tube.

14. The method of claim 1, wherein removing the unfused powder comprises vacuuming the unmelted powder through the tube.

15. The method of claim 1, wherein the removable support structure includes a second tube, wherein removing the unfused powder comprises blowing a gas through the first tube and vacuuming the unfused powder through the second tube.

16. The method of claim 1, wherein the first opening is located at a first side of the object at the first height and the second opening is located at the second height at a second side opposite of the first side.

17. The method of claim 1, wherein the second height of the second opening is at an intersection of the wall and a bottom surface.

18. The method of claim 17, wherein the second height of the second opening is at a bottom corner of the object.

19. The method of claim 1, wherein the first height of the first opening is at an intersection of two internal surfaces of the object.

* * * * *